United States Patent
Rozenfeld (10) Patent No.: US 8,156,477 B2
(45) Date of Patent: Apr. 10, 2012

(54) METHOD AND SYSTEM FOR ASSESSING VIRTUALIZATION CAPABILITY OF A SOFTWARE APPLICATION

(75) Inventor: Isaac Rozenfeld, New York, NY (US)

(73) Assignee: Oracle America, Inc., Redwood City, CA (US)

( * ) Notice: Subject to any disclaimer, the term of this patent is extended or adjusted under 35 U.S.C. 154(b) by 1175 days.

(21) Appl. No.: 11/944,252

(22) Filed: Nov. 21, 2007

(65) Prior Publication Data

US 2009/0133001 A1    May 21, 2009

(51) Int. Cl.
*G06F 9/44* (2006.01)
(52) U.S. Cl. ......... 717/127; 717/139; 717/174; 709/223
(58) Field of Classification Search .............. 717/120, 717/127, 136, 173–178; 709/201, 203, 220, 709/222, 224, 226, 227
See application file for complete search history.

(56) References Cited

U.S. PATENT DOCUMENTS

| | | | | |
|---|---|---|---|---|
| 5,642,417 A * | 6/1997 | Stringer | | 717/174 |
| 7,178,142 B2 * | 2/2007 | Bennett et al. | | 717/168 |
| 7,904,909 B1 * | 3/2011 | Reiner et al. | | 718/104 |
| 2005/0076156 A1 * | 4/2005 | Lowell | | 710/1 |
| 2007/0250829 A1 * | 10/2007 | Hillier et al. | | 717/170 |

OTHER PUBLICATIONS

Adams et al., A Comparison of Software and Hardware Techniques for x86 Virtualization, Oct. 21-25, 2006, ACM, pp. 1-13.*
Smith, Workstation Virtualization Software Review, Berkeley, CA, Aug. 15, 2007, pp. 1-12.*

* cited by examiner

*Primary Examiner* — Wei Zhen
*Assistant Examiner* — Satish Rampuria
(74) *Attorney, Agent, or Firm* — Osha • Liang LLP (57) ABSTRACT

A method for assessing virtualization capability of a software application involves monitoring execution of the software application to obtain performance data associated with the software application, analyzing the performance data to determine whether the software application satisfies virtualization requirements, and generating a virtualization score indicating virtualization capability of the software application based on the analyzing.

20 Claims, 3 Drawing Sheets

METHOD AND SYSTEM FOR ASSESSING VIRTUALIZATION CAPABILITY OF A SOFTWARE APPLICATION

BACKGROUND

Broadly speaking, virtualization is the abstraction of computing resources such as storage devices, processors, networking, and memory. Virtualized computing environments provide interfaces to software applications where the actual structure of underlying computing resources is hidden from the software applications. For example, virtualization may be used to make multiple computing resources appear to software applications as a single computing resource, or may be used to make a single computing resource appear to software applications as multiple computing resources.

Using virtualization to make multiple computing resources appear as a single computing resource is commonly referred to as 'resource pooling.' Resource pooling may be as simple as spanning multiple hard disks in a single computer system to create a single volume. Resource pooling may also be used to combine resources from multiple computer systems. For example, supercomputers often use resource pooling to draw processing capability from a cluster of computer systems. Many different types of resource pooling exist.

Using virtualization to make a single computing resource appear as multiple computing resources is commonly referred to as 'virtual partitioning' or 'zoning.' For example, Sun Solaris™ provides zoning capabilities at the operating system level using Solaris™ Containers. Each Solaris™ Container may be configured to act as an isolated virtual server, though multiple Solaris™ Containers may be executing in a single computer system. Solaris™ is a trademark of Sun Microsystems in Menlo Park, Calif. Many different types of virtual partitioning exist.

Resource pooling and virtual partitioning may also be combined. For example, computing resources from multiple computer systems may be pooled and then partitioned as needed. The partitions need not conform to the underlying hardware boundaries. Thus, partitioning of pooled resources allows for flexible control over the use of available computing resources.

When resource pooling and/or virtual partitioning are used, software applications executing in the virtualized environment may be required to satisfy virtualization requirements. For example, Solaris™ Containers share a single operating system kernel. If a software application that modifies the kernel were allowed to execute in a Solaris™ Container, the modification might adversely affect other Solaris™ Containers sharing the same kernel. Therefore, write access to the kernel is typically prohibited within Solaris™ Containers. Generally speaking, because virtualization relies on abstraction boundaries, software applications are restricted from crossing those boundaries.

SUMMARY

In general, in one aspect, the invention relates to a method for assessing virtualization capability of a software application. The method comprises monitoring execution of the software application to obtain a plurality of performance data associated with the software application, analyzing the plurality of performance data to determine whether the software application satisfies a plurality of virtualization requirements, and generating a virtualization score indicating virtualization capability of the software application based on the analyzing.

In general, in one aspect, the invention relates to a system comprising a memory, a processor, a plurality of software monitoring tools configured to monitor execution of a software application to obtain a plurality of performance data associated with the software application, and a virtualization assessment tool. The virtualization assessment tool is configured to analyze the plurality of performance data to determine whether the software application satisfies a plurality of virtualization requirements, and generate a virtualization score indicating virtualization capability of the software application based on the analyzing. The plurality of software monitoring tools and the virtualization assessment tool are resident in the memory and executed by the processor.

In general, in one aspect, the invention relates to a computer readable medium comprising a plurality of executable instructions for assessing virtualization capability of a software application. The plurality of executable instructions comprises instructions to monitor execution of the software application to obtain a plurality of performance data associated with the software application, analyze the plurality of performance data to determine whether the software application satisfies a plurality of virtualization requirements, and generate a virtualization score indicating virtualization capability of the software application based on the analyzing.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for assessing virtualization capability of a software application, i.e., whether the software application is capable of executing in a virtualized environment. During execution of the software application, performance data are gathered. The performance data are analyzed to determine whether the software application satisfies virtualization requirements. Based on the analysis, a virtualization score is generated indicating the software application's virtualization capability.

Figure 1:
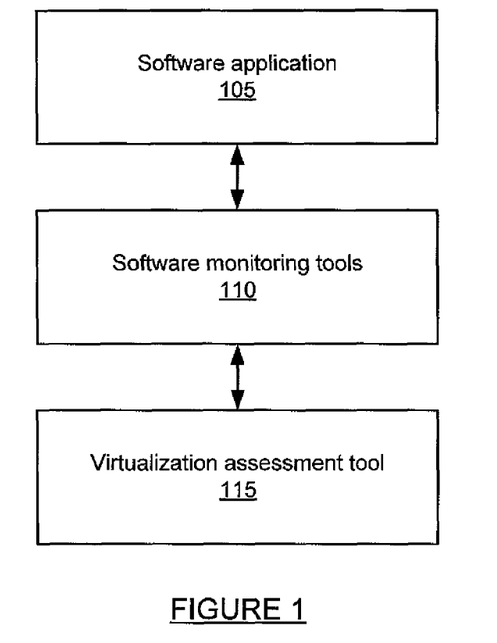
FIG. 1 shows a diagram of a system in accordance with one or more embodiments of the invention.

FIG. 1 shows a diagram of a system in accordance with one or more embodiments of the invention. The system includes a software application (105) to be assessed for virtualization capability. Specifically, the software application (105) is to be assessed for compatibility with a target virtualized environment (not shown). For example, the target virtualized environment may be a Solaris™ Container, a logical domain (e.g., based on the Solaris™ 4v architecture), a XenSource™ instance, or any other type of virtualized environment. The software application (105) may be a service, a script, a stand-alone application, or any other type of software configured to execute in a computer system. XenSource™ is a trademark of XenSource, Inc. in Palo Alto, Calif.

Further, the system includes software monitoring tools (110) configured to monitor execution of the software application (105). Specifically, the software monitoring tools (110) are configured to gather performance data about the software application (105) based on the monitoring. In one or more embodiments, each of the software monitoring tools (110) is configured to monitor a different subsystem of the software application (105). For example, the software tools (110) may be configured to monitor the software application's (105) network stack usage, storage input/output, processor usage, operating system dependencies, and/or security features such as enforcement of access privileges. Many different subsystems of the software application (105), or combinations thereof, may be monitored.

Further, many different types of performance data relating to the subsystem(s) of the software application (105) may be gathered. For example, the performance data may include total execution time, total memory pages used, total virtual memory used, page size used, privileges used, system calls used, shared library procedure calls used, Transmission Control Protocol (TCP) ports used, User Datagram Protocol (UDP) ports used, storage space consumed, filesystems accessed, raw devices accessed, shared memory used, temporary and/or "scratch" memory used, scheduling and/or priority requirements, or any other type of data associated with performance of the software application (105). The aforementioned types of performance data are provided for exemplary purposes only and should not be construed as limiting the scope of the invention.

In one or more embodiments, the software monitoring tools (110) include one or more probes in a tracing framework. Probes are instrumentation points associated with the software application (105). When a probe is enabled and a condition specified by the probe is satisfied, the probe 'fires' and an action associated with the probe is executed. For example, a probe may fire when a particular variable reaches a predefined trigger value. For the purposes of the software monitoring tools (110), the action may include logging performance data to a file, a pipe, or any other output location.

One example of a tracing framework is the DTrace tracing framework designed for Sun Solaris™. DTrace uses kernel integration to allow administrators to arbitrarily define probes for monitoring the operating system and user programs. Many different types of tracing frameworks exist. Alternatively, performance data may be gathered using debug statements, logging tools, and/or other known software monitoring mechanisms. Further, different types of software monitoring mechanisms may be combined. For example, information from DTrace probes may be combined with process information gathered by a kernel statistics tool such as Kstat in Sun Solaris™. Many different combinations of software monitoring mechanisms may be used.

Further, the system includes a virtualization assessment tool (115). The virtualization assessment tool (115) is configured to use the performance data to assess virtualization capability of the software application (105). Specifically, the virtualization assessment tool (115) is configured to analyze the performance data to determine whether the software application (105) satisfies virtualization requirements.

In one or more embodiments, the virtualization requirements include a standard set of virtualization requirements for all software applications. The virtualization requirements may also include one or more project-specific virtualization requirements. In this context, the term 'project' refers to a classification mechanism in which workloads and/or services are grouped using project labels. For example, Sun Solaris™ includes functionality to group related processes into composite tasks, and each task may be assigned to a particular project using a project label. Thus, a project-specific virtualization requirement is a virtualization requirement that is specific to components (i.e., processes, services, etc.) with the same project label. In one or more embodiments, the software application (105) is one of the aforementioned components. Examples of virtualization requirements (project-specific and otherwise) are discussed below.

Further, the virtualization assessment tool (115) is configured to generate a virtualization score indicating the software application's (105) virtualization capability based on the aforementioned analysis. If project-specific virtualization requirements are specified, the virtualization score may be wholly or partially based on the project-specific virtualization requirements. The virtualization assessment tool (115) may also be communicatively coupled with a display device and configured to display the virtualization score to a user. Examples of virtualization scores are discussed below.

In one or more embodiments, the virtualization assessment tool (115) is further configured to prepare the software application (105) for a virtualized environment. Specifically, if the software application (105) satisfies the virtualization requirements, the virtualization assessment tool (115) may have enough information to generate a virtualization template for the software application (105). The virtualization template includes software instructions for hosting the software application (105) in the virtualized environment. The software instructions may include eXtensible Markup Language (XML) tags, compiled code, configuration settings, and/or any other sort of computer-readable instructions.

For example, if the virtualized environment uses Solaris™ Zones (a type of Solaris™ Container), the virtualization template may be a Solaris™ Zone manifest. A Solaris™ Zone manifest is an XML template that includes settings for creating a Solaris™ Zone. In one or more embodiments, the virtualization assessment tool (115) is configured to generate an XML template for a Solaris™ Zone that is properly configured to host the software application (105). The virtualization template may also include Solaris™ Resource Manager settings.

Table 1 shows an example of a Solaris™ Zone manifest for a zone called "betazed," in accordance with one or more embodiments of the invention. Table 1 is provided for exemplary purposes only and should not be construed as limiting the scope of the invention.

TABLE 1

Example of a Solaris™ Zone manifest

```
<?xml version="1.0" encoding="UTF-8"?>
<!DOCTYPE zone PUBLIC "-//Sun Microsystems Inc//DTD Zones//EN" "file:///usr/share/lib/xml/dtd/zonecfg.dtd.1">
<zone name="betazed" zonepath="/export/allzones_configs/betazed" autoboot="true">
```

TABLE 1-continued

Example of a Solaris™ Zone manifest

```
<inherited-pkg-dir directory="/lib"/>
<inherited-pkg-dir directory="/platform"/>
<inherited-pkg-dir directory="/sbin"/>
<inherited-pkg-dir directory="/usr"/>
<filesystem special="/export/allzones_data/betazed/export/home" directory="/expo
rt/home" type="lofs">
<fsoption name="rw"/>
<fsoption name="nodevices"/>
</filesystem>
<network address="192.168.1.205" physical="hme0"/>
<rctl name="zone.cpu-shares">
<rctl-value priv="privileged" limit="20" action="none"/>
</rctl>
<attr name="comment" type="string" value="This is zone named Betazed"/>
<dev-perm name="pts/0" uid="0" gid="7" mode="620" acl=""/>
<dev-perm name="pts/1" uid="0" gid="7" mode="620" acl=""/>
<dev-perm name="pts/2" uid="0" gid="7" mode="620" acl=""/>
<dev-perm name="pts/3" uid="0" gid="7" mode="720" acl=""/>
<dev-perm name="pts/4" uid="0" gid="3" mode="644" acl=""/>
<dev-perm name="pts/5" uid="0" gid="3" mode="644" acl=""/>
<dev-perm name="pts/6" uid="0" gid="3" mode="644" acl=""/>
<dev-perm name="pts/7" uid="0" gid="3" mode="644" acl=""/>
<dev-perm name="pts/8" uid="0" gid="3" mode="644" acl=""/>
<dev-perm name="pts/9" uid="0" gid="3" mode="644" acl=""/>
<dev-perm name="pts/10" uid="0" gid="3" mode="644" acl=""/>
<dev-perm name="pts/11" uid="0" gid="3" mode="644" acl=""/>
<dev-perm name="pts/12" uid="0" gid="3" mode="644" acl=""/>
<dev-perm name="pts/13" uid="0" gid="3" mode="644" acl=""/>
<dev-perm name="pts/14" uid="0" gid="3" mode="644" acl=""/>
<dev-perm name="pts/15" uid="0" gid="3" mode="644" acl=""/>
<dev-perm name="pts/16" uid="0" gid="3" mode="644" acl=""/>
<dev-perm name="pts/17" uid="0" gid="3" mode="644" acl=""/>
<dev-perm name="pts/18" uid="0" gid="3" mode="644" acl=""/>
<dev-perm name="pts/19" uid="0" gid="3" mode="644" acl=""/>
<dev-perm name="pts/20" uid="0" gid="3" mode="644" acl=""/>
<dev-perm name="pts/21" uid="0" gid="3" mode="644" acl=""/>
<dev-perm name="pts/22" uid="0" gid="3" mode="644" acl=""/>
<dev-perm name="pts/23" uid="0" gid="3" mode="644" acl=""/>
<dev-perm name="pts/24" uid="0" gid="3" mode="644" acl=""/>
<dev-perm name="pts/25" uid="0" gid="3" mode="644" acl=""/>
<dev-perm name="pts/26" uid="0" gid="3" mode="644" acl=""/>
<dev-perm name="pts/27" uid="0" gid="3" mode="644" acl=""/>
<dev-perm name="pts/28" uid="0" gid="3" mode="644" acl=""/>
<dev-perm name="pts/29" uid="0" gid="3" mode="644" acl=""/>
<dev-perm name="pts/30" uid="0" gid="3" mode="644" acl=""/>
<dev-perm name="pts/31" uid="0" gid="3" mode="644" acl=""/>
<dev-perm name="pts/32" uid="0" gid="3" mode="644" acl=""/>
<dev-perm name="sad/user" uid="0" gid="3" mode="666" acl=""/>
<dev-perm name="logindmux" uid="0" gid="3" mode="600" acl=""/>
<dev-perm name="null" uid="0" gid="3" mode="666" acl=""/>
<dev-perm name="zero" uid="0" gid="3" mode="666" acl=""/>
<dev-perm name="conslog" uid="0" gid="3" mode="666" acl=""/>
<dev-perm name="log" uid="0" gid="3" mode="640" acl=""/>
<dev-perm name="tty" uid="0" gid="7" mode="666" acl=""/>
<dev-perm name="ptmx" uid="0" gid="3" mode="666" acl=""/>
<dev-perm name="openprom" uid="0" gid="3" mode="640" acl=""/>
<dev-perm name="udp" uid="0" gid="3" mode="666" acl=""/>
<dev-perm name="tcp" uid="0" gid="3" mode="666" acl=""/>
<dev-perm name="arp" uid="0" gid="3" mode="666" acl=""/>
<dev-perm name="kstat" uid="0" gid="3" mode="666" acl=""/>
<dev-perm name="ticots" uid="0" gid="3" mode="666" acl=""/>
<dev-perm name="ticotsord" uid="0" gid="3" mode="666" acl=""/>
<dev-perm name="ticlts" uid="0" gid="3" mode="666" acl=""/>
<dev-perm name="poll" uid="0" gid="3" mode="666" acl=""/>
<dev-perm name="udp6" uid="0" gid="3" mode="666" acl=""/>
<dev-perm name="tcp6" uid="0" gid="3" mode="666" acl=""/>
<dev-perm name="random" uid="0" gid="3" mode="644" acl=""/>
<dev-perm name="urandom" uid="0" gid="3" mode="644" acl=""/>
<dev-perm name="sysevent" uid="0" gid="3" mode="600" acl=""/>
<dev-perm name="crypto" uid="0" gid="3" mode="666" acl=""/>
<dev-perm name="cryptoadm" uid="0" gid="3" mode="644" acl=""/>
<dev-perm name="dtrace/helper" uid="0" gid="3" mode="666" acl=""/>
<dev-perm name="pool" uid="0" gid="3" mode="666" acl=""/>
<dev-perm name="cpu/self/cpuid" uid="0" gid="3" mode="644" acl=""/>
<dev-perm name="zfs" uid="0" gid="3" mode="666" acl=""/>
<dev-perm name="zconsole" uid="0" gid="3" mode="600" acl=""/>
</zone>
```

Many different types of virtualization templates may be used, and virtualization templates may be in a format other than XML. Further, the virtualization assessment tool (115) may not have enough information to fully complete the virtualization template, and a user may be required to manually enter missing elements, or make other related system changes, prior to using the virtualization template.

Depending on the specific type of virtualized environment used, many different virtualization requirements may be enforced. The virtualization requirements may also vary from one subsystem of the software application (105) to the next. The next few paragraphs describe some examples of virtualization requirements for various subsystems. These particular subsystems and associated requirements are provided for exemplary purposes only, and should not be construed as limiting the scope of the invention.

Regarding network stack usage, the software application (105) may be restricted from operating at network stack levels where virtualization is not supported. For example, certain versions of Solaris™ Containers do not support virtualization at the datalink layer. Further, certain types of Quality of Service (QoS) requirements may not be supported, such as maximum latency requirements. In contrast, in one or more embodiments of the invention, features such as Internet Protocol (IP) instances, vanity naming, flow control, and/or IP Multi-Pathing (IPMP) may be supported by the virtualized environment. If monitoring detects that the software application (105) uses the network stack in an unsupported manner, the virtualization assessment tool (115) may determine that the software application (105) does not satisfy a virtualization requirement.

Regarding storage input/output, the software application (105) may be restricted from accessing types of storage devices that are not supported by the virtualized environment. For example, some types of third-party volume managers may not be supported by the virtualized environment. If monitoring detects that the software application (105) attempts to access an unsupported storage device, the virtualization assessment tool (115) may determine that the software application (105) does not satisfy a virtualization requirement.

Regarding processor usage, processors may be grouped into processor groups for the purposes of controlling scheduling affinity and/or minimizing execution latency. For example, processor groups may be used when dealing with High Performance Computing (HPC) workloads. The use of processor groups may be dictated by the software application (105). However, the virtualized environment may not support processor groups. For example, certain versions of Solaris™ Containers do not support processor groups by executing processes. Further, the virtualized environment may not support operations that alter a processor state, such as taking a processor off-line or brining the processor on-line. In general, if monitoring detects that the software application (105) attempts to use a processor in an unsupported manner, the virtualization assessment tool (115) may determine that the software application (105) does not satisfy a virtualization requirement.

Regarding operating system dependencies, the software application (105) may depend on operating system features that are not available in the virtualized environment. For example, the software application (105) may depend on an operating system kernel module that is not present in the virtualized environment. As another example, the software application (105) may depend on system calls that are restricted in the virtualized environment, such as system calls that modify the operating system kernel. If monitoring detects that the software application (105) depends on an operating system feature that is unavailable or restricted in the virtualized environment, the virtualization assessment tool (115) may determine that the software application (105) does not satisfy a virtualization requirement. In one or more embodiments of the invention, operating system dependencies are identified by monitoring library calls, system calls, and shared objects accessed by the software application (105).

Regarding security features, the software application (105) may be restricted from the virtualized environment due to security concerns. For example, as noted above, the software application (105) may include system calls that modify the operating system kernel. For example, Network File System (NFS) services typically include tight kernel integration and are therefore generally not supported in Solaris™ Containers without substantial modifications. In general, tight kernel integration may be discouraged in the virtualized environment, due to the risk of kernel modification and/or corruption. In one or more embodiments of the invention, the software application (105) must have a verifiably secure execution path to satisfy the virtualization requirements. If monitoring detects that the software application (105) does not have a verifiably secure execution path, the virtualization assessment tool (115) may determine that the software application (105) does not satisfy a virtualization requirement.

Further, as noted above, one or more project-specific virtualization requirements may be used. For example, there may be a requirement that all components of the project support a particular operating system version (e.g., a particular operating system kernel version). Further, there may be a requirement that all components of the project use unique network ports. If multiple components of a project use the same network port, incompatibilities may occur. In general, project-specific virtualization requirements may be specified to help ensure that the various components of the project are mutually compatible. If monitoring detects that the software application (105) is incompatible with another component of the same project, the virtualization assessment tool (115) may determine that the software application (105) does not satisfy a virtualization requirement.

Whether or not project-specific virtualization requirements are specified, those skilled in the art will appreciate that virtualized environments typically include multiple software applications resident in memory simultaneously. Thus, in one or more embodiments of the invention, the software application (105) must also be compatible with other software applications that are candidates for the same virtualized environment. For example, it is generally unadvisable to place multiple software applications with real-time execution demands in the same virtualized environment, due to the resource contention that may result. Further, the ability to co-host software applications in a virtualized environment may depend on the software applications' collective storage needs and the amount of storage available in the virtualized environment. Software applications that make heavy use of the network stack may encounter similar resource contention issues. Many different types of software incompatibilities exist. If monitoring detects that the software application (105) is incompatible with another software application, the virtualization assessment tool (115) may determine that the software application (105) does not satisfy a virtualization requirement.

As discussed above, the virtualization assessment tool (115) is configured to generate a virtualization score for the software application (105). In one or more embodiments, the virtualization score is specific to a particular subsystem of the software application (105). Thus, the virtualization assessment tool (115) may in fact generate a separate virtualization score for each subsystem that is monitored. Alternatively, a single virtualization score may be used to represent virtualization capability of the software application (105) as a whole.

A virtualization score may take many forms. In one or more embodiments, the virtualization score is simply a pass/fail determination, i.e., a determination that the software application (105) either does or does not satisfy a virtualization requirement. Alternatively, the virtualization score may have several possible values, indicating to what extent the software application (105) satisfies the virtualization requirements. Further, the virtualization score may indicate what types of changes (if any) are necessary to host the software application (105) in a virtualized environment.

For example, a traffic light metaphor may be used to indicate whether the software application (105) satisfies a virtualization requirement. A score with a 'green light' may indicate that no changes are required for virtualization of the software application (105). In other words, the software application (105) fully satisfies the virtualization requirement. A score with a 'yellow light' may indicate that a configuration change—but no application code change—is required for virtualization of the software application (105). In other words, the software application (105) partly satisfies the virtualization requirement, and a relatively non-obtrusive change may be made to fully satisfy the virtualization requirement. A score with a 'red light' may indicate that an application code change is required for virtualization of the software application (105). In one or more embodiments of the invention, the traffic light metaphor provides simple visual cues to identify the virtualization capability of the software application (105).

Figure 2:
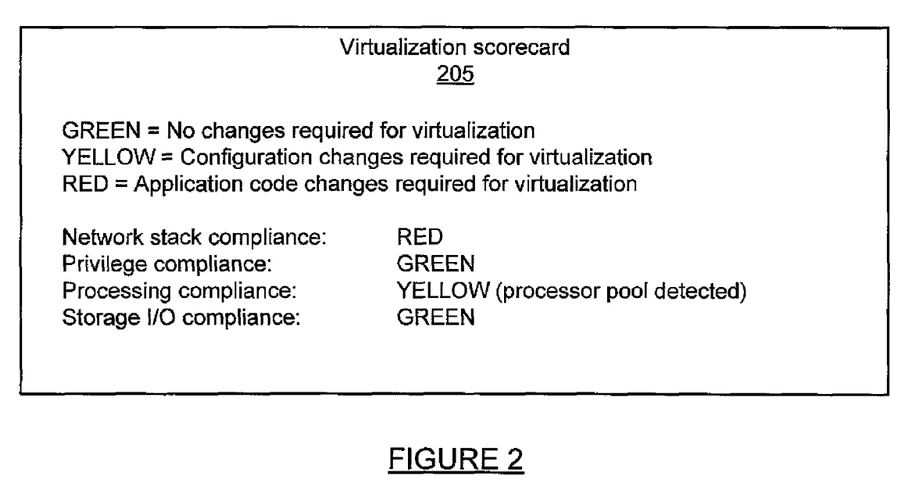
FIG. 2 shows a diagram of a virtualization scorecard in accordance with one or more embodiments of the invention.

FIG. 2 shows a diagram of a virtualization scorecard (205) in accordance with one or more embodiments of the invention. In FIG. 2, the virtualization scorecard (205) includes virtualization scores for a software application's network stack compliance, privilege compliance, processing compliance, and storage input/output compliance. However, embodiments of the invention should not be considered limited to the virtualization scores shown in FIG. 2. The virtualization scorecard (205) also includes descriptions of what the different scores (i.e., GREEN, YELLOW, and RED) indicate. While the virtualization scorecard (205) in FIG. 2 displays the virtualization scores as text, colored icons or any other sort of visual representation may be used. Further, as shown in FIG. 2, virtualization scores may be accompanied by text (e.g., "processor pool detected") explaining the reason for the virtualization score. In this example, the existence of a processor pool was flagged because the virtualized environment does not support processor pooling by executing processes. This restriction is provided for exemplary purposes only, as some virtualized environments may support processor pooling by executing processes.

The virtualization scorecard (205) shown in FIG. 2 is provided for exemplary purposes only. Many different types of virtualization scores may be envisioned that remain within the scope of the invention. For example, virtualization scores may be represented as numerical values (e.g., on a scale of one to ten), letter grades, graphical icons, and/or sentences. Further, a virtualization score may be auditory rather than visual. Any type of virtualization score may be used, as long as the virtualization score provides information about the virtualization capacity of the software application under consideration.

Figure 3:
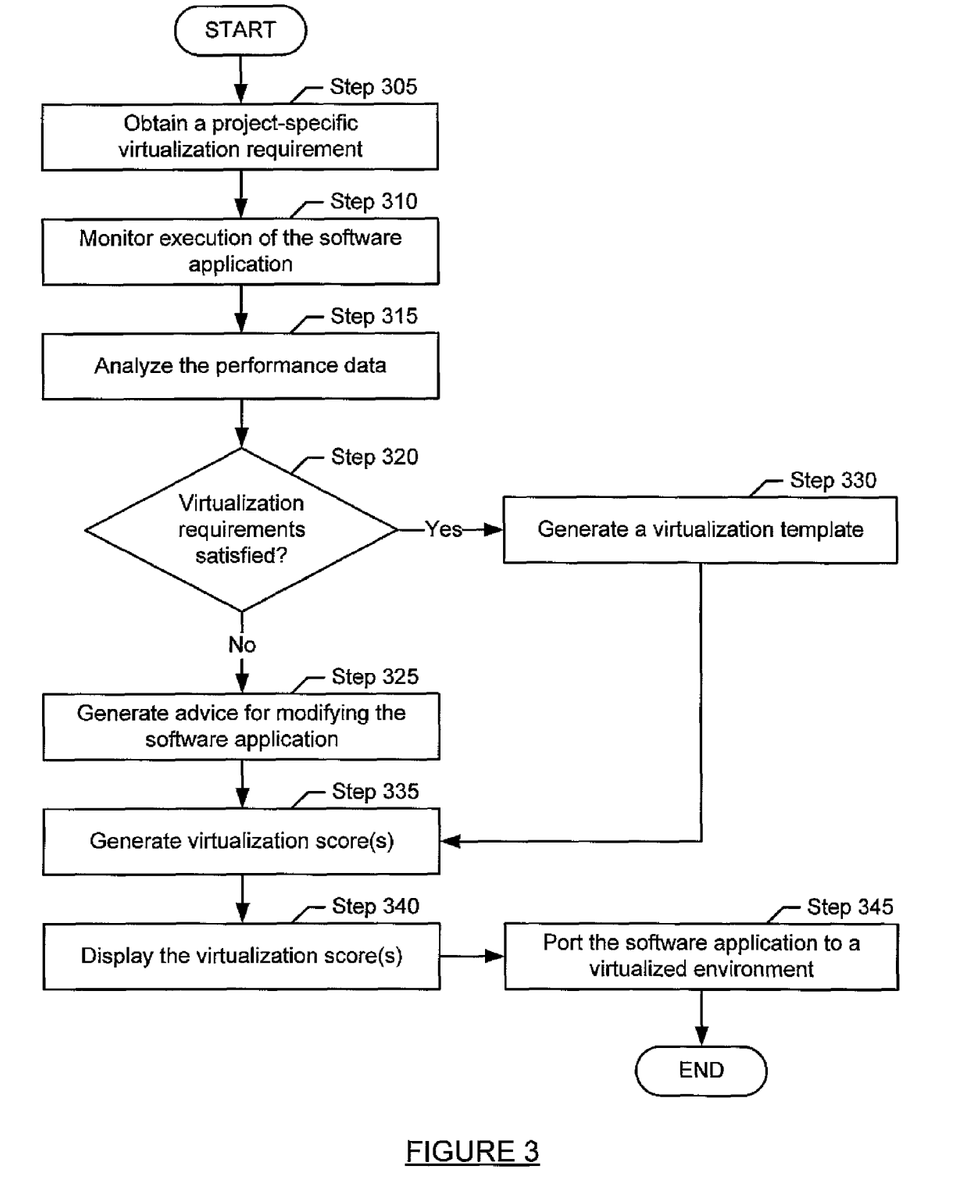
FIG. 3 shows a flowchart of a method for assessing virtualization capability of a software application in accordance with one or more embodiments of the invention.

FIG. 3 shows a flowchart of a method for assessing virtualization capability of a software application in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangement of steps shown in FIG. 3.

As noted above, the virtualization requirements may include one or more project-specific virtualization requirements. In one or more embodiments of the invention, in Step 305, a project-specific virtualization requirement is obtained. For example, the project-specific virtualization requirement may be specified by a user, based on the user's knowledge of the software application. Alternatively, the project-specific virtualization requirement may be automatically generated based on a property of the software application. For example, a script may have different virtualization requirements than a service.

In Step 310, execution of the software application is monitored to obtain performance data. The performance data may include a log of system calls, processor usage, network stack usage, or any other type of information related to one or more subsystems or features of the software application. Examples of performance data are discussed above. As noted above, monitoring the software application may involve the use of probes in a tracing framework, debug statements, logging tools, and/or other known software monitoring mechanisms.

In Step 315, the performance data is analyzed to determine whether the software application satisfies the virtualization requirements. For example, the performance data may be analyzed to determine whether the software application uses an unsupported storage device or depends on a restricted operating system feature. The specific type of analysis performed may depend on the nature of the virtualization requirements being enforced.

As indicated in Step 320, different actions may be performed depending on whether the software application satisfies the virtualization requirements. If the software application does not satisfy the virtualization requirements, then in Step 325, advice may be generated indicating suggested modifications to the software application. For example, the advice may indicate a configuration change that would allow the software application to satisfy the virtualization requirements.

On the other hand, if the analysis of Step 315 indicates that the software application does satisfy the virtualization requirements, enough information may be present to wholly or partially prepare the software application for a virtualized environment. Accordingly, Step 330 may be performed to generate a virtualization template for the software application. Different types of virtualization templates are discussed above. For example, the virtualization template may be an XML template for creating a Solaris™ Container with the proper configuration for hosting the software application.

Regardless of whether the software application satisfies the virtualization requirements, in Step 335, a virtualization score is generated based on the analysis of Step 315. The virtualization score indicates whether the software application is capable of virtualization. In one or more embodiments of the invention, multiple virtualization scores are generated. For example, virtualization scores may be generated for multiple subsystems of the software application.

In one or more embodiments of the invention, in Step 340, the virtualization score(s) is/are displayed to a user on a computer monitor or other display device. If the virtualization score(s) is/are auditory, the virtualization score(s) may be communicated via a computer speaker. Further, if advice was generated in Step 325, the advice may be displayed along with the virtualization score(s).

In one or more embodiments of the invention, in Step 345, the software application is ported to the virtualized environment. For example, if Solaris™ Containers are used, the software application may be hosted in a Solaris™ Container. If the analysis of Step 315 indicated that the virtualization requirements were not satisfied, Step 345 may not be performed until the necessary modifications to the software application have been completed (for example, based on advice generated in Step 325). Further, if a virtualization template was generated in Step 330, the virtualization template may be used to port the software application to the virtualized environment.

In one or more embodiments of the invention, the method of FIG. 3 may be used to implement a feedback loop for successfully porting the software application to the virtualized environment. In this context, the 'feedback loop' refers to an iterative process of generating the virtualization score(s) and modifying the software application based on the virtualization score(s). For example, this sort of feedback loop may help identify a situation where a first round of modifications to the software application 'breaks' compatibility with a previously satisfied virtualization requirement. Thus, repeating the method of FIG. 3 after modifying the software application may help ensure that modifications were successful and the software application is ready to be ported to the virtualized environment.

Embodiments of the invention may be practiced in many different situations. For example, embodiments of the invention may be practiced during server consolidation, where multiple underutilized servers are consolidated in a single computer system. For example, if Solaris™ Containers are used, each of the servers may be ported to a different Solaris™ Container executing in the same computer system. In some cases, software applications from multiple servers may be ported to a single Solaris™ Container. Regardless of the specific type of virtualized environment used, for each server being consolidated, it is essential to know whether the associated software applications are capable of virtualization. Accordingly, embodiments of the invention may facilitate the process of determining which servers to consolidate.

Generally speaking, embodiments of the invention facilitate the assessment of whether a software application is capable of virtualization, i.e., capable of executing in a virtualized environment. For example, automating the assessment process using software monitoring tools may reduce the amount of time (and therefore money) required to perform the assessment. Further, because the assessment is based on actual performance data, embodiments of the invention may reduce the likelihood of error in the assessment process. That is, an automated assessment based on actual performance data may be less error-prone than a manual assessment process. Further, virtualization scores provide a convenient way of communicating the results of the assessment.

Figure 4:
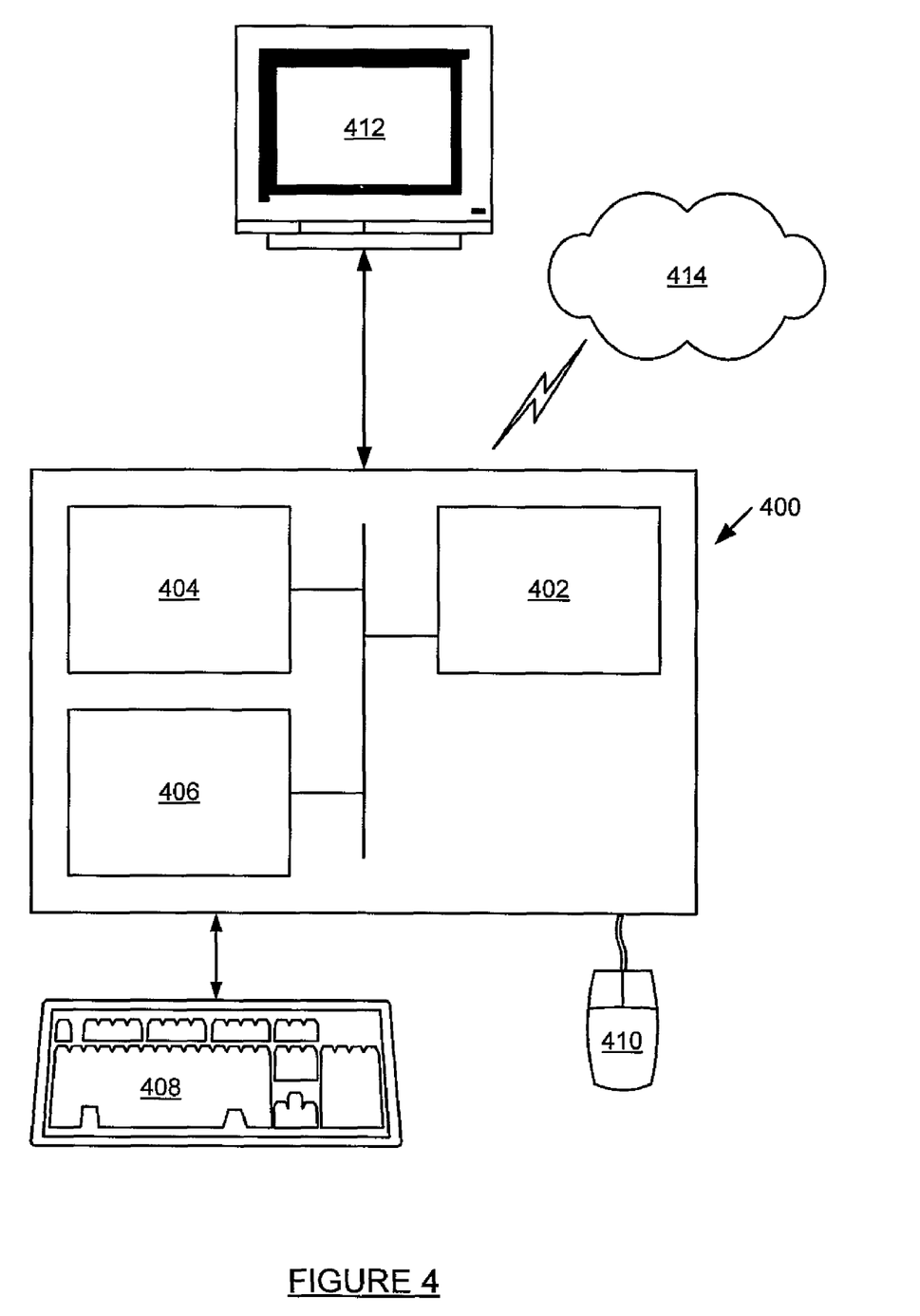
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., software application, software monitoring tools, virtualization assessment tool, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assessing virtualization capability of a software application, comprising:
monitoring execution of at least a first subsystem of the software application and a second subsystem of the software application to obtain a plurality of performance data associated with each of the first and second subsystems of the software application,
wherein the first subsystem comprises network stack usage and the second subsystem comprises storage input/output, and wherein performance data obtained for each of the first and second subsystems includes at least execution time, memory usage, and port usage, and
wherein the monitoring is performed by a plurality of probes executing in a tracing framework and placed at a plurality of points in the software application;
analyzing the plurality of performance data to determine whether the software application satisfies a plurality of virtualization requirements; and
generating a virtualization score indicating virtualization capability of the software application based on the analyzing, wherein the virtualization score indicates how easily the software application is able to be ported to a particular virtualized environment with which the plurality of virtualization requirements are associated.

2. The method of claim 1, further comprising:
displaying the virtualization score to a user.

3. The method of claim 1, further comprising:
generating a virtualization template for the software application based on the virtualization score, wherein the virtualization template comprises a plurality of software instructions for hosting the software application in a virtualized environment.

4. The method of claim 1, further comprising:
obtaining a project-specific virtualization requirement for the software application, wherein the virtualization score is further based on the project-specific virtualization requirement.

5. The method of claim 1, wherein the virtualization score comprises one selected from the group consisting of a first value indicating that no changes are required for virtualization of the software application, a second value indicating that a configuration change is required for virtualization of the software application, and a third value indicating that an application code change is required for virtualization of the software application.

6. The method of claim 1, wherein the virtualization score is specific to one selected from a group consisting of the first subsystem and the second subsystem of the software application.

7. The method of claim 1, wherein the plurality of virtualization requirements comprises at least one selected from the group consisting of a verifiably secure execution path of the software application and compatibility of the software application with other software applications that are candidates for virtualization.

8. A system comprising:
a memory;
a processor;
a plurality of software monitoring tools configured to monitor execution of at least a first subsystem of a software application and a second subsystem of the software application to obtain a plurality of performance data associated with the each of the first and second subsystems of the software application,
wherein the first subsystem comprises network stack usage and the second subsystem comprises storage input/output, and wherein performance data obtained for each of the first and second subsystems includes at least execution time, memory usage, and port usage, and
wherein the monitoring is performed by a plurality of probes executing in a tracing framework and placed at a plurality of points in the software application; and
a virtualization assessment tool configured to:
analyze the plurality of performance data to determine whether the software application satisfies a plurality of virtualization requirements, and
generate a virtualization score indicating virtualization capability of the software application based on the analyzing, wherein the virtualization score indicates how easily the software application is able to be ported to a particular virtualized environment with which the plurality of virtualization requirements are associated,
wherein the plurality of software monitoring tools and the virtualization assessment tool are resident in the memory and executed by the processor.

9. The system of claim 8, wherein the virtualization assessment tool is further configured to:
display the virtualization score to a user.

10. The system of claim 8, wherein the virtualization assessment tool is further configured to:
generate a virtualization template for the software application based on the virtualization score, wherein the virtualization template comprises a plurality of software instructions for hosting the software application in a virtualized environment.

11. The system of claim 8, wherein the virtualization assessment tool is further configured to:
obtain a project-specific virtualization requirement for the software application, wherein the virtualization score is further based on the project-specific virtualization requirement.

12. The system of claim 8, wherein the virtualization score comprises one selected from the group consisting of a first value indicating that no changes are required for virtualization of the software application, a second value indicating that a configuration change is required for virtualization of the software application, and a third value indicating that an application code change is required for virtualization of the software application.

13. The system of claim 8, wherein the virtualization score is specific to one of the first or the second subsystems of the software application.

14. A non-transitory computer readable medium comprising a plurality of executable instructions for assessing virtualization capability of a software application, wherein the plurality of executable instructions comprises instructions to:
monitor execution of at least a first subsystem of the software application and a second subsystem of the software application to obtain a plurality of performance data associated with each of the first and second subsystems of the software application,
wherein the first subsystem comprises network stack usage and the second subsystem comprises storage input/output, and wherein performance data obtained for each of the first and second subsystems includes at least execution time, memory usage, and port usage, and
wherein the monitoring is performed by a plurality of probes executing in a tracing framework and placed at a plurality of points in the software application;
analyze the plurality of performance data to determine whether the software application satisfies a plurality of virtualization requirements; and
generate a virtualization score indicating virtualization capability of the software application based on the analyzing, wherein the virtualization score indicates how easily the software application is able to be ported to a particular virtualized environment with which the plurality of virtualization requirements are associated.

15. The non-transitory computer readable medium of claim 14, wherein the plurality of executable instructions further comprises instructions to:
display the virtualization score to a user.

16. The non-transitory computer readable medium of claim 14, wherein the plurality of executable instructions further comprises instructions to:
generate a virtualization template for the software application based on the virtualization score, wherein the virtualization template comprises a plurality of software instructions for hosting the software application in a virtualized environment.

17. The non-transitory computer readable medium of claim 14, wherein the plurality of executable instructions further comprises instructions to:
obtain a project-specific virtualization requirement for the software application, wherein the virtualization score is further based on the project-specific virtualization requirement.

18. The non-transitory computer readable medium of claim 14, wherein the virtualization score comprises one selected from the group consisting of a first value indicating that no changes are required for virtualization of the software application, a second value indicating that a configuration change is required for virtualization of the software application, and a third value indicating that an application code change is required for virtualization of the software application.

19. The non-transitory computer readable medium of claim 14, wherein the virtualization score is specific to one selected from a group consisting of the first susbsystem and the second subsystem of the software application.

20. The non-transitory computer readable medium of claim 14, wherein the plurality of virtualization requirements comprises at least one selected from the group consisting of a verifiably secure execution path of the software application and compatibility of the software application with other software applications that are candidates for virtualization.

* * * * *